(12) United States Patent
Chiku et al.

(10) Patent No.: US 6,757,960 B2
(45) Date of Patent: Jul. 6, 2004

(54) METHOD FOR MANUFACTURING HERMETICALLY SEALED PRESSURE DETECTING APPARATUS

(75) Inventors: Kazuhiro Chiku, Kariya (JP); Seiichirou Ootake, Hazu-gun (JP)

(73) Assignee: Denso Corporation, Kariya (JP)

( * ) Notice: Subject to any disclaimer, the term of this patent is extended or adjusted under 35 U.S.C. 154(b) by 34 days.

(21) Appl. No.: 09/760,708

(22) Filed: Jan. 17, 2001

(65) Prior Publication Data

US 2001/0009059 A1 Jul. 26, 2001

(30) Foreign Application Priority Data

Jan. 21, 2000 (JP) ........................................ 2000-017820

(51) Int. Cl.[7] .......................... B29C 45/46; B22D 11/12
(52) U.S. Cl. ................ 29/527.3; 29/527.1; 264/328.12; 264/271.1; 264/272.11; 249/97; 249/85; 425/542
(58) Field of Search ................................ 29/450, 527.1, 29/621.1, 883, 856, 858, 458; 264/328.12, 35, 271.1, 272.11, 272.14, 272.17, 279, 279.1; 425/542; 438/51; 249/83, 85, 96, 97; 257/417

(56) References Cited

U.S. PATENT DOCUMENTS

| 4,293,182 A | * | 10/1981 | Schwartz ................. 339/275 R |
| 5,585,061 A | * | 12/1996 | Hara et al. .................... 264/259 |
| 5,595,939 A | | 1/1997 | Otake et al. ................... 438/51 |
| 5,604,372 A | * | 2/1997 | Yamaguchi .................. 257/417 |
| 5,926,952 A | * | 7/1999 | Ito ............................... 29/883 |
| 6,219,913 B1 | * | 4/2001 | Uchiyama ..................... 29/883 |

FOREIGN PATENT DOCUMENTS

| GB | 2 118 477 A | * | 11/1983 |
| JP | 58-25931 | * | 8/1981 |
| JP | 7-209115 | | 8/1995 |
| JP | A-H10-138310 | | 5/1998 |

* cited by examiner

Primary Examiner—I Cuda-Rosenbaum
Assistant Examiner—Marc Jimenez
(74) Attorney, Agent, or Firm—Posz & Bethards, PLC

(57) ABSTRACT

A pressure detecting apparatus is composed of a first case insert-molded with connector pins, and a second case made of metal. The first case and the second case are assembled together to form a pressure detection chamber hermetically sealed with an O-shaped ring sandwiched between seal surfaces of the two cases. The first case is formed by using a molding die that has a gate for injecting resin approximately in parallel with a seal correspondence surface for forming the seal surface of the first case.

9 Claims, 6 Drawing Sheets

METHOD FOR MANUFACTURING HERMETICALLY SEALED PRESSURE DETECTING APPARATUS

CROSS REFERENCE TO RELATED APPLICATION

This application is based upon and claims the benefit of Japanese Patent Applications No. 2000-17820 filed on Jan. 21, 2000, the contents of which are incorporated herein by reference.

BACKGROUND OF THE INVENTION

1. Field of the Invention

This invention relates to a method for manufacturing a (O-shaped ring sealing type) pressure detecting apparatus with a pressure detection chamber that is hermetically sealed by a resin-molded first case and a second case assembled together with an O-shaped ring interposed therebetween, and to a molding device suitably used for manufacturing the pressure detecting apparatus.

2. Description of the Related Art

As this kind of pressure detecting apparatus, for example, JP-A-7-209115 and JP-A-7-243926 propose seal diaphragm type semiconductor pressure detecting apparatuses and methods for manufacturing the same with a decreased number of parts, simplified manufacturing process, high reliability and low cost. The pressure detecting apparatuses are generally used for detecting refrigerant pressures of a vehicle air conditioner, power steering oil pressure, and the like, a detection pressure range of which is 0 to about 10 MPa.

FIG. 5A shows a cross-sectional shape of an O-shaped ring sealing type pressure detecting apparatus. A pressure detection chamber J5 is provided by assembling a molded resin case (first case) J2 holding connector pins J1 therein, and a metallic housing (second case) J4 having a seal diaphragm J3. A sensor element (integrated element) J6 fixed to a base is held in the pressure detection chamber J5 that is filled with oil J7 for transmitting pressure from the seal diaphragm J3.

At an outer periphery of the pressure detection chamber J5, an O-shaped ring J8 is fit in a groove (O-shaped ring groove) formed on an end surface of the resin case J2 in a state where it is sandwiched between a metallic pushing plate J9 of the housing J4 and the resin case J2. The O-shaped ring J8 hermetically seals the pressure detection chamber J5.

The above-described pressure detecting apparatus is generally manufactured as follows. First, the resin case is formed by injection molding with a die. The pressure detection chamber J5 holding the sensor element J6 therein is formed by assembling the resin case J2 having a recess filled with the oil J7 for the pressure detection chamber J5, and the housing J4. At that time, the O-shaped ring J8 is sandwiched and crushed between the case J2 and the housing J4 at the outer periphery of the pressure detection chamber J5, and the case J2 and the housing J4 are fixedly assembled together by caulking fixation or the like. Thus, the basic structure of the pressure detecting apparatus is manufactured.

A detecting operation of this pressure detecting apparatus is as follows. That is, pressure introduced from a pressure conduction hole J10 of the housing J4 is received by the seal diaphragm J3 and is transmitted to the oil J7. Then, the sensor element J6 detects the pressure of this oil J7, and outputs an output signal proportional to the pressure.

In the above-described detecting operation, however, if the oil J7 is leaked from the pressure detection chamber J5, the pressure cannot be transmitted appropriately. Because of this, in this kind of pressure detecting apparatus, the hermetic sealing of the pressure detection chamber J5, i.e., the sealing of the oil J7 by the O-shaped ring J8 is important. Here, FIG. 5B is an enlarged view of a portion indicated by arrow VB in FIG. 5A, and FIG. 5C is a cross-section of the O-shaped ring J8 in the radial direction thereof.

In general, the sealing property of the O-shaped ring J8 is secured by surface roughness and flatness of seal surfaces J21, J41 of the resin case J2 and the housing J4 sandwiching the O-shaped ring J8, and the compressibility of the O-shaped ring J18 compressed by the seal surfaces J21, J41. Here, the surface roughness and the flatness are set to be 12.5 S or less, and 0.05 mm or less, respectively, as values based on JIS (Japanese Industrial Standards).

The compressibility is generally in a range of 10 to 30%, which is a value represented by $100 \times (D1-D2)/D1(\%)$. Incidentally, D1 is a diameter of the cross-section of the O-shaped ring J8 in the radial direction thereof, D2 is a diameter of the radial direction cross-section of the O-shaped ring J8 in the compressive direction. This compressibility of the O-shaped ring J8 varies due to flatness of the respective seal surfaces J21, J41. When the seal surfaces have irregularities, the compressibility varies on the circumference of the O-shaped ring J8 to have large variations. Therefore, it is important to make the respective seal surfaces flat.

The seal surface J41 of the housing J4 that is formed form metallic plate by welding can readily have satisfactory surface roughness and flatness. However, because the seal surface J21 of the resin case J2 is formed from resin by molding, the surface roughness and flatness are readily affected by its molded state. That is, in the O-shaped ring sealing type pressure detecting apparatus described above, the satisfactory surface roughness and flatness of the O-shaped ring seal surface at the resin case side cannot be attained stably.

SUMMARY OF THE INVENTION

The present invention has been made in view of the above problems. An object of the present invention is to provide a pressure detecting apparatus composed of first and second cases assembled together to form a hermetically sealed pressure detection chamber with an O-shaped ring with a sufficient sealing property. Another object of the present invention is to provide a method and a device for forming the first case from resin with a seal surface having satisfactory surface roughness and flatness.

According to the present invention, briefly, a molding die used for forming a first case has a seal correspondence surface for forming a seal surface of the first case, and a gate for injecting resin. The gate is provided at a position capable of injecting resin so that the resin flows in the molding die approximately in parallel with the seal correspondence surface. Accordingly, the resin is suppressed from hitting the seal correspondence surface of the molding die, and the seal surface formed by this molding die can have sufficient surface roughness and flatness stably.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENT

The preferred embodiment of the invention is explained with reference to appended drawings. A pressure detecting apparatus 100 according to the present embodiment is applicable to a device, for example, that is mounted on a vehicle to detect a brake oil pressure or a high fuel pressure.

Figure 1:
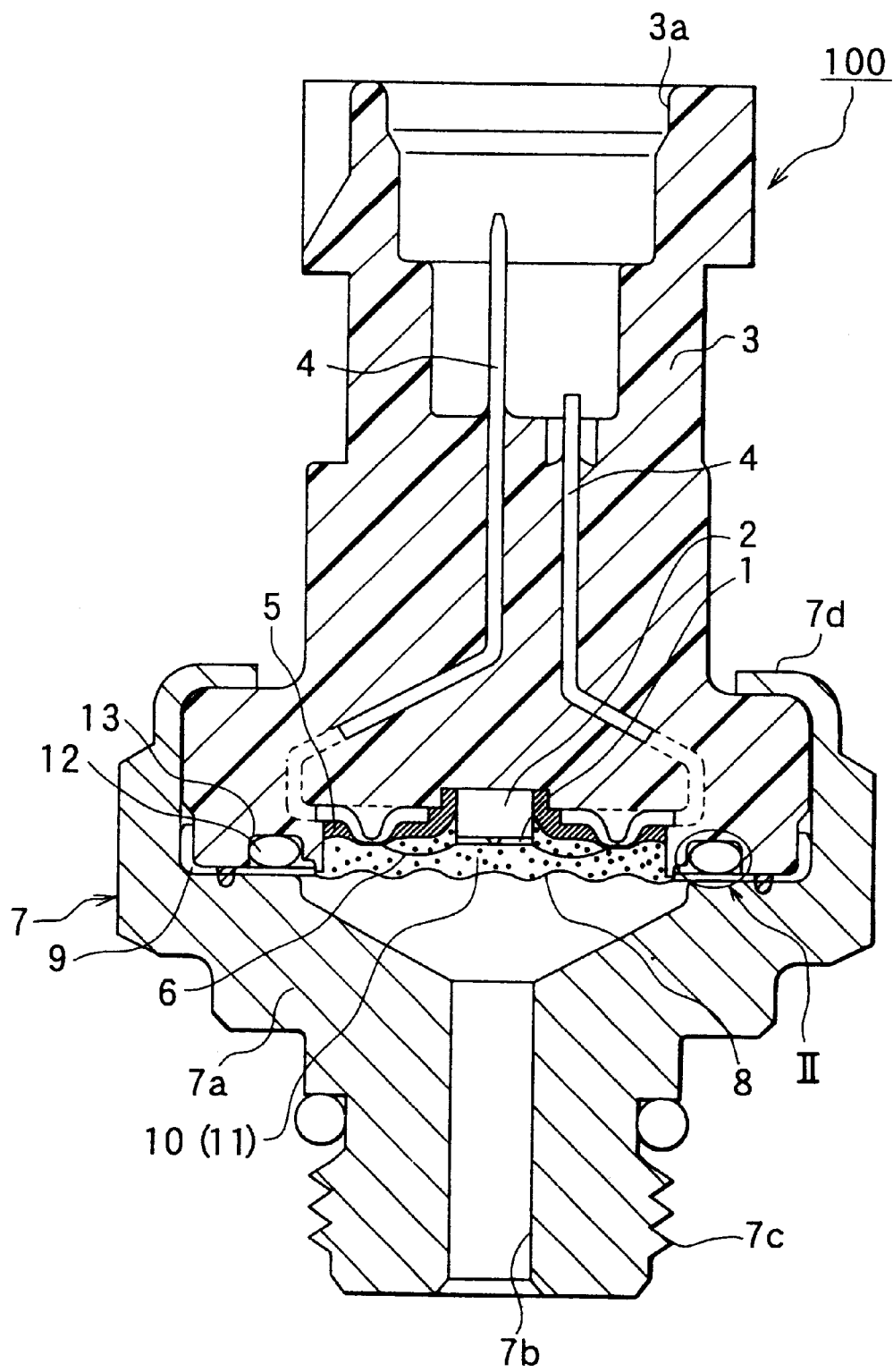
FIG. 1 is a cross-sectional view showing a pressure detecting apparatus according to a preferred embodiment of the invention.

Referring to FIG. 1, a sensor element (integrated sensor element) 1 made of semiconductor or the like for converting a pressure signal into an electrical signal is anodic-bonded to a base 2 made of glass, and fixed to a recess portion of a connector case (first case) 3 by adhesive such as silicone rubber. The connector case 3 has a cylindrical shape with steps formed by molding (injection molding) of resin, and connector pins 4 for outputting the electrical signal are integrally formed with the connector case 3 by insert molding.

The connector case 3 has a connecting portion 3a at an end side (upper side in FIG. 1) in an axial direction thereof, and the recess portion at the other end side (lower side in FIG. 1) thereof. The connecting portion 3a is provided for electrically connecting one end side of the connector pins 4 to an external circuit (ECU or the like of a vehicle) via a wire harness or the like. In the recess portion, the other end side of the connector pins 4 are sealed by an interface sealing agent 5 made of silicone rubber or the like.

The sensor element 1 is electrically connected to the other end side of the connector pins 4 via bonding wires 6 or the like in the recess portion of the connector case 3, and the electrical signal from the sensor element 1 is transmitted to the external circuit via the boding wires 6 and the connector pins 4.

A housing (second case) 7 has a body portion 7a made of metal (for example, plated carbon steel). The body portion 7a has a pressure conduction hole 7b for introducing measurement pressure (pressure to be detected) and a screw portion 7c for fixing the apparatus to an appropriate position. The housing 7 is so constructed that a thin seal diaphragm 8 made of metal (such as SUS) and a pushing member 9 made of metal (such as SUS) are welded to the body portion 7a at entire peripheries thereof to be hermetically bonded to an end of the pressure conduction hole 7b.

The connector case 3 and the housing 7 are fixedly assembled together by caulking or the like, so that a pressure detection chamber 10 is provided between the recess portion of the connector case 3 and the diaphragm 8 of the housing 7. Oil 11 as sealing liquid and as a pressure transmittance medium is sealed in the pressure detection chamber 10, and a liquid-sealing structure is constructed by the seal diaphragm 8 and the interface sealing agent 5.

Further, an O-shaped ring 12 made of an elastic material such as Si (silicon) rubber is fit in a groove (O-shaped groove) 13 provided at the outer periphery of the pressure detection chamber 10 on the end surface of the connector case 3 at the recess portion side (first axial end side) so as to hermetically seal the pressure detection chamber 10. The groove 13 has an annular shape corresponding to the outer circumferential shape of the O-shaped ring 12.

Figure 2:
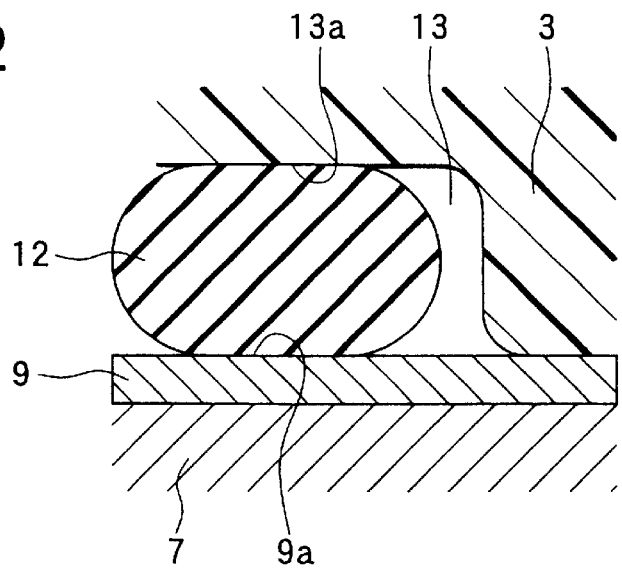
FIG. 2 is an enlarged view of a part indicated by arrow II.

Here, FIG. 2 is an enlarged view of a portion indicated by arrow R in FIG. 1 (enlarged cross-sectional view showing the vicinity of the O-shaped ring). As shown in FIG. 2, the groove 13 has a bottom surface 13a parallel to the end surface of the connector case 13 at the recess portion side. The bottom surface 13a corresponds to a seal surface of the connector case 13 supporting the O-shaped ring 12. On the other hand, the pushing member 9 of the housing 9 has a surface 9a corresponding to a seal surface at the side of the housing 7. The surface 9a is approximately parallel to the seal surface 13a of the connector case 13 in this embodiment.

The O-shaped ring 12 is sandwiched by the seal surfaces 9a, 13a in the groove 13, and is compressed in the direction in which the seal surfaces 9a, 13a surface each other. Because of this, the O-shaped ring 12 having a radial direction cross-section of a circle is deformed as shown in FIG. 2 to fitly contact the seal surfaces 9a, 13a. In consequence, the pressure detection chamber 10 can be hermetically sealed with the oil 11 sealed therein.

A detecting operation of the pressure detecting apparatus 100 described above is as follows. The pressure detecting apparatus 100 is, for example, installed on a fuel pipe of a vehicle at the housing 7. In this state, pressure is introduced from the pressure conduction hole 7a of the housing 7, received by the seal diaphragm 8, and transmitted to the oil 11 sealed in the pressure detection chamber 10. Then, the sensor element 1 detects the pressure of the oil 11, and outputs an electric signal proportional to the pressure. The output signal is transmitted to the external circuit via the bonding wires 6 and the connector pins 4.

Figure 3:
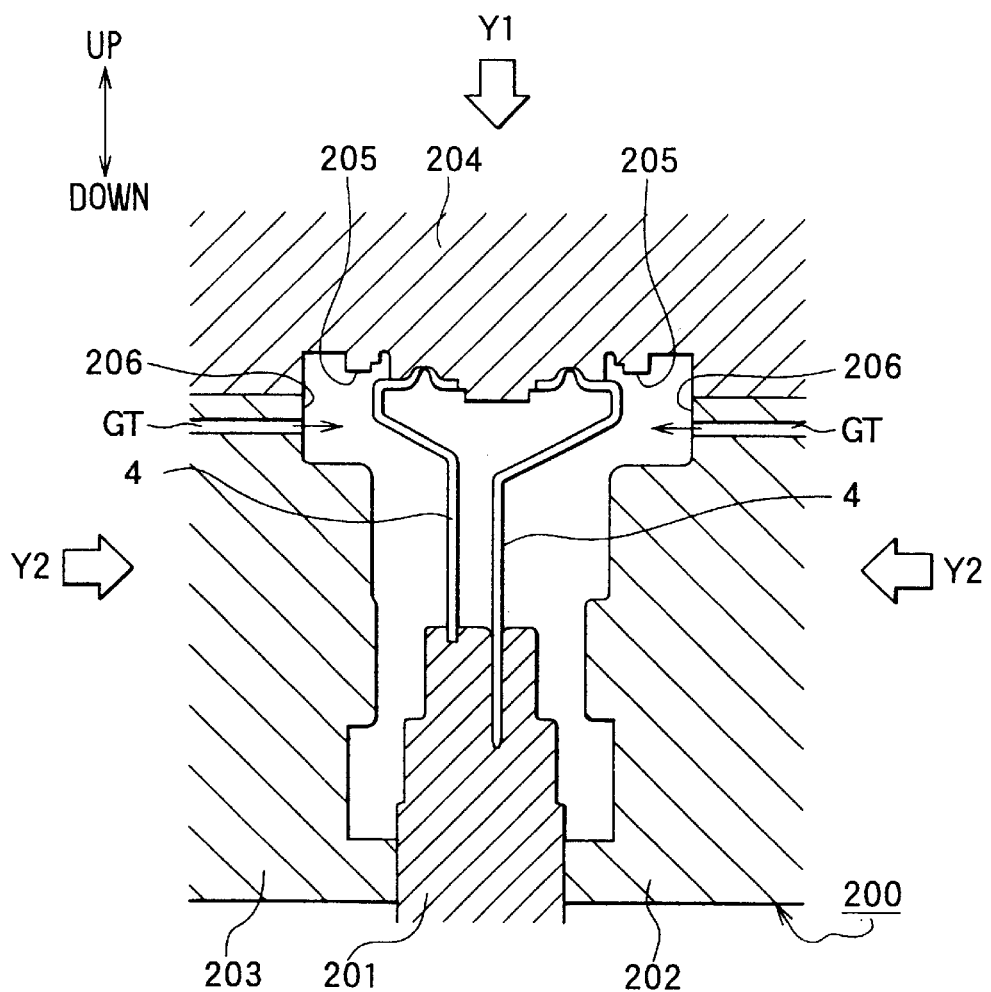
FIG. 3 is a cross-sectional view schematically showing a molding die used for forming a connector case in FIG. 1.

Next, a method for manufacturing the pressure detecting apparatus 100 having the constitution as described above is explained. First, at a first case formation step, the connector case 3 is molded with thermoplastic resin such as PPS (polyphenylene sulfide) containing glass fibers (for example, 30 wt %). A molding device (resin molding machine) used at the first case formation step is shown in FIG. 3.

A molding die 200 has a shape corresponding to the contour of the generally cylindrical connector case 3 having steps. The molding die 200 is composed of a first sub-die 201 corresponding to the connecting portion 3a (second axial end side) of the connector case 3, a second sub-die 202 and a third sub-die 203 corresponding to the side surface of the connector case 3, and a fourth sub-die 204 corresponding to the recess portion side (first axial end side) of the connector case 3. This divided configuration of the sub-dies is an example, and can be changed flexibly.

Here, the fourth sub-die 204 is provided for forming the recess portion of the connector case 3 and the groove 13 provided at the outer periphery of the recess portion. The fourth sub-die 204 is formed with a seal correspondence surface 205 corresponding to the seal surface 13a of the connector case 3.

The second and third sub-dies 202, 203 respectively have gates (having resin injection ports) GT for injecting molten resin into the molding die 200. The gates GT are provided so that injected resin can flow approximately in parallel with the seal correspondence surface 205 in the molding die 200. In this embodiment, the gates GT are open on a surface (gate formation surface) 206 that is perpendicular to the seal correspondence surface 205 in the assembled molding die 200, and extend approximately in parallel with the seal correspondence surface 205.

The first sub-die 201 has insertion holes in which the connector pins 4 are inserted for fixation when the connector pins 4 are insert-molded during the molding of the connector case 3. The first to fourth sub-dies 201 to 204 are movable by a hydraulic cylinder or a motor of the molding device not shown to be separated from each other, or to be assembled together.

At the first case formation step using this molding device, first, the connector pins 4 are inserted into the insertion holes of the first sub-die 201 that is fixed, so that the connector pins 4 are fixed. Next, the fourth sub-die 204 is moved downward toward the first sub-die 201 in a direction indicated by arrow Y1 in FIG. 3 until it contacts the connector pins 4. The fourth sub-die 204 fixedly pushes the connector pins 4.

Then, the second and third sub-dies 202, 203 are moved in lateral directions (indicated by arrows Y2 in FIG. 3) to specific positions (for example, positions contacting the first and fourth sub-dies 201, 204) corresponding to the contour of the connector case 3. Thus, the first to fourth sub-dies 201–204 are assembled together, thereby providing the configuration of the molding die 200 coincident to the contour of the connector case 3.

Successively, molten resin (such as PPS) is injected into the molding die 200 through the gates GT. After the resin inside the molding die 200 is hardened, the first to fourth sub-dies 201–204 are moved to separate from each other, and the molded connector case 3 is taken out. This is the first case formation step.

Figure 4:
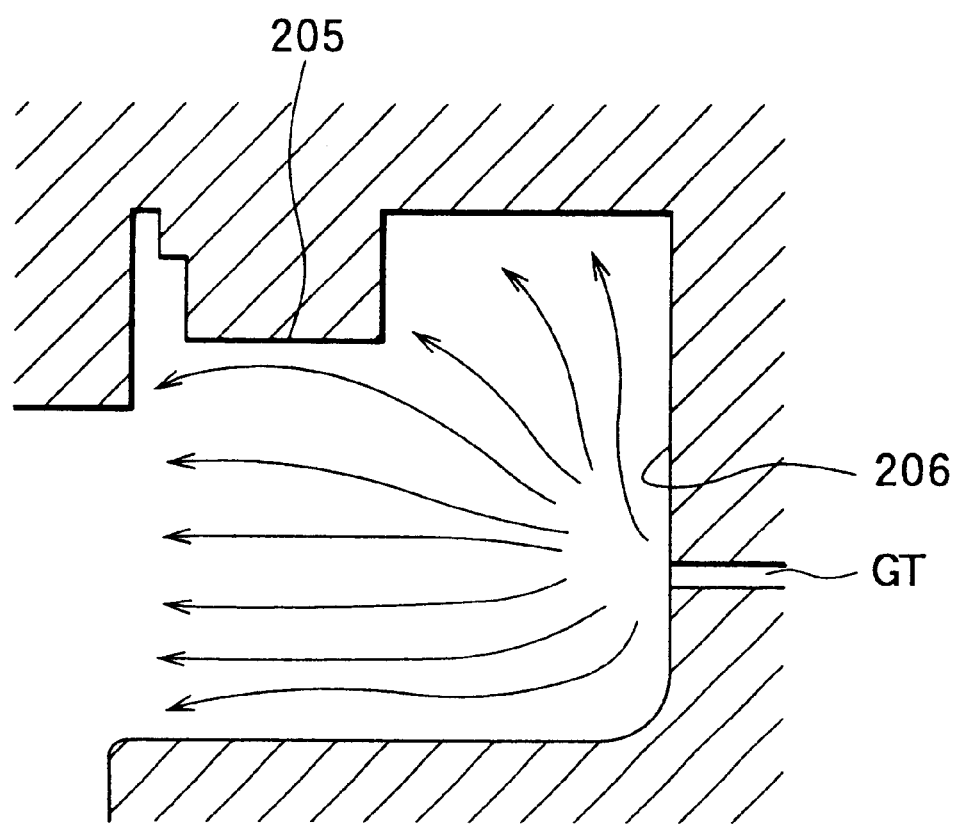
FIG. 4 is a schematic view showing a flow of resin in the molding die shown in FIG. 3.
Figure 5B:
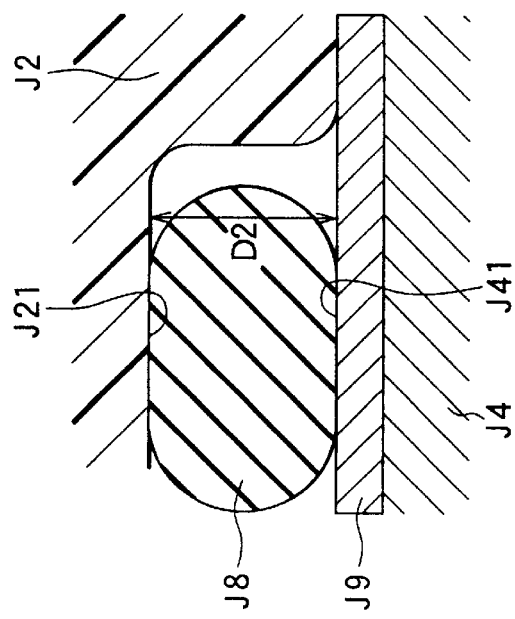
FIG. 5B is an enlarged view of a part indicated by arrow VB in FIG. 5A.
Figure 5C:
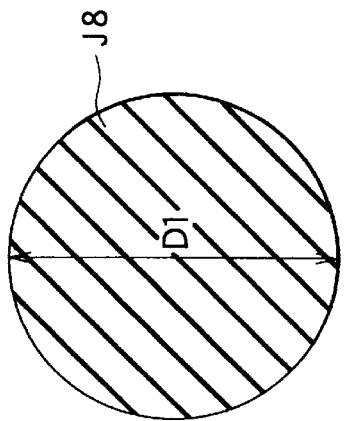
FIG. 5C is a radial direction cross-sectional view showing an O-shaped ring.
Figure 5A:
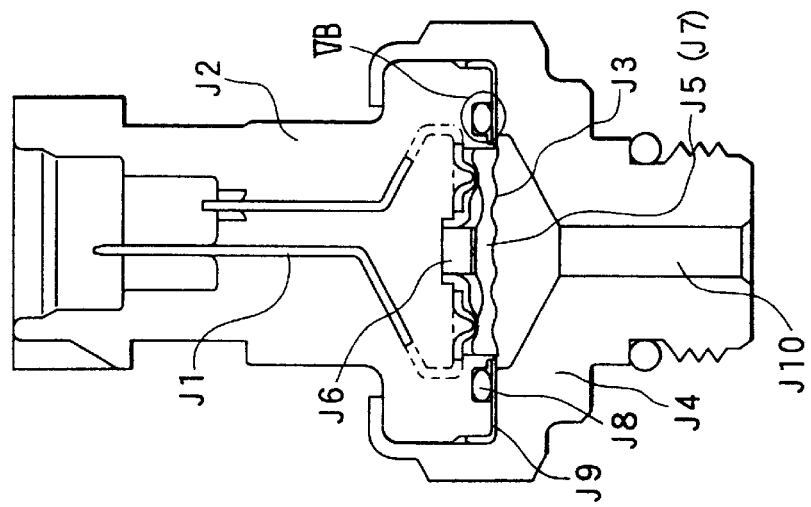
FIG. 5A is a cross-sectional view showing a pressure detecting apparatus according to a related art.

Here, FIG. 4 schematically shows a result obtained by simulating a resin flow in the molding die 200 at the first case formation step in this embodiment. According to this embodiment, the resin injected from the gates GT flows, as indicated by several arrows in FIG. 4, approximately in parallel with the seal correspondence surface 205 of the molding die 200. Because of this, as compared to a comparative example of injection molding shown in FIGS. 6A and 6B, resin is difficult to hit the seal correspondence surface 205 in the sealing die 200.

Figure 6A:
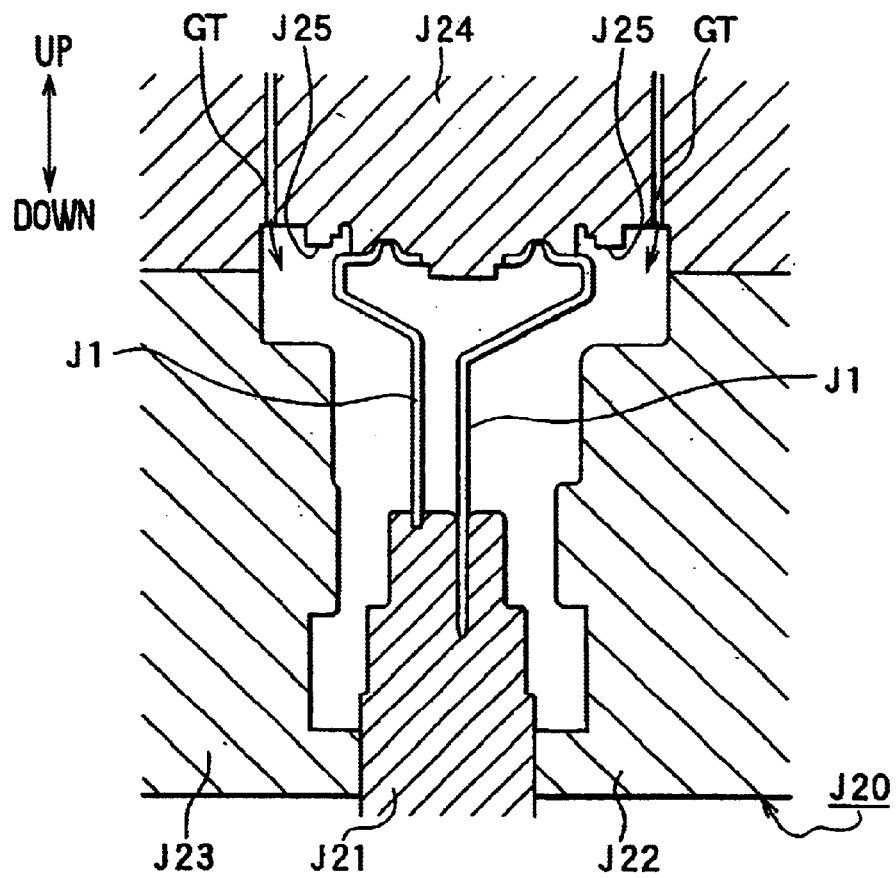
FIG. 6A is a cross-sectional view showing a molding die as a comparative example.
Figure 6B:
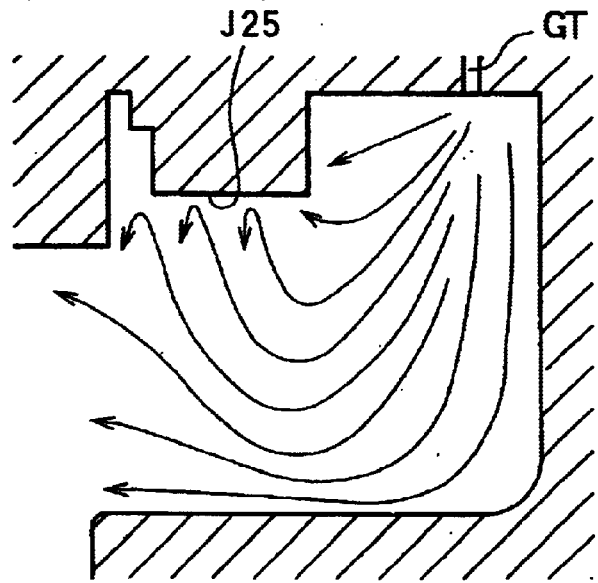
FIG. 6B is a schematic view showing a flow of resin in the molding die shown in FIG. 6A.

Here, the comparative example shown in FIGS. 6A and 6B are explained specifically. FIG. 6A shows a molding die J20 composed of four sub-dies J21 to J24. The molding die J20 has a gate GT at an upper portion of the molding die J20 for securely injecting resin downward and for preventing deformation of connector pins J1. In FIG. 6A, reference numeral J25 denotes a surface (seal correspondence surface) corresponding a seal surface of the first case.

FIG. 6B shows a result obtained by simulating the flow of resin in the molding die J20. According to the figure, the resin injected from the upper portion downwardly is turned by the surface facing the gate GT, and hits the seal correspondence surface J25 in an approximately perpendicular or slightly inclined direction. Because of this, in the comparative example, unlike the present embodiment, the seal surface formed by this molding die is liable to be warped, and is difficult to have satisfactory surface roughness and flatness stably.

In this embodiment, the connector case 3 is molded into a cylindrical shape, which is assembled with the housing 7 and has the seal surface 13a parallel to the end surface at the axial first end side thereof. Therefore, when this connector case 3 having the above-described structure is adopted and the gates GT are formed to open on the gate formation surface 206 in the molding die 200, the injecting direction can be controlled to be approximately parallel to the seal correspondence surface 205. As a result, the injected resin is liable to flow approximately in parallel with the seal correspondence surface 205. Incidentally, like the comparative example, it is experimentally confirmed that the resin can flow downward securely and the inert-molded connector pins 4 are prevented from being bent even in this embodiment.

Next, an assembling step is performed. Specifically, the base 2 and the sensor element 1 are disposed in the recess portion of the connector case 3 that is formed by injection molding, and the sensor element 1 and the connector pins 4 are connected by the bonding wires 6. After that, the O-shaped ring 12 is disposed in the groove 13. The connector case 3 is disposed so that the sensor element 1 thereof is positioned at the upper side, and oil 11 of a specific amount is injected, by a dispenser or the like, into the recess portion from the upper side of the connector case 3.

Then, the housing 7 to which the seal diaphragm 8 is welded at the entire periphery thereof is brought downward toward the connector case 3 while keeping horizontality thereof, and the housing 7 is pushed until the pushing member 9 of the housing 7 contacts the end surface of the connector case 3 at the axial first end side sufficiently. An end portion 7d of the housing 7 is caulked at the entire periphery thereof in this state. In consequence, the connector case 3 and the housing 7 are assembled together, and the pressure detection chamber 10 is formed.

When the housing 7 is pushed until the pushing member 9 contacts the connector case 3 sufficiently, the pushing member 9 pushes the O-shaped ring 12 while covering the groove 13. Accordingly, the O-shaped ring 12 can seal the oil 11 securely. Thus, the O-shaped ring 12 is sandwiched between the connector case 3 and the housing 7 and the pressure detection chamber 10 is sealed at the outer periphery thereof. This is the assembling step.

Incidentally, the oil 11 hermetically sealed in the pressure detection chamber 10 may contain bubbles therein. However, as disclosed in JP-A-7-243926, the bubbles can be removed by application of pressure from the pressure conduction hole 7b, or the like. Thus, the pressure detecting apparatus 100 shown in FIG. 1 is completed.

According to the above-described embodiment, the gates GT are positioned so that resin is suppressed from hitting the seal correspondence surface 205 in the molding die 200. Therefore, satisfactory surface roughness and flatness of the seal surface 13a of the resin-molded connector case 3 can be stably realized in this embodiment.

Also, when glass fibers are contained in the resin for reinforcement or the like as described above, the coefficient of contraction of the resin when the resin hardens is varied due to influence of the thermal expansion coefficient of the glass fibers. Because of this, the flatness of the seal surface of the first case is liable to deteriorate. This embodiment is especially effective in such a case. The connector case 3 may be formed from resin without the glass fibers, by injection molding.

For example, when the connector case (first case) 3 is formed from PPS containing glass fibers at 30 wt %, the seal surface of the first case formed as in the comparative example had surface roughness of 9.3 S and flatness of 0.05 mm. To the contrary, the seal surface 13a formed as in this embodiment had surface roughness of 1.8 S and flatness of 0.02 mm. Thus, it is revealed that the satisfactory surface roughness and flatness can be stably realized according to the present embodiment.

Also, the present embodiment provides the molding device for forming the pressure detecting apparatus, with the molding die 200. The molding die 200 is for forming the connector case 3 from resin, and has the gates GT at positions that can inject resin approximately in parallel with the seal correspondence surface 205 of the molding die 200.

As described above, in the comparative example, the injecting direction of resin from the gates GT crosses the seal correspondence surface J25, for example, at a right angle. As opposed to this, in this embodiment, the gates CT are positioned so that the injecting direction of resin becomes approximately parallel to the seal correspondence surface 205. Accordingly, resin flows approximately in parallel with the seal correspondence surface 205.

Figure 7:
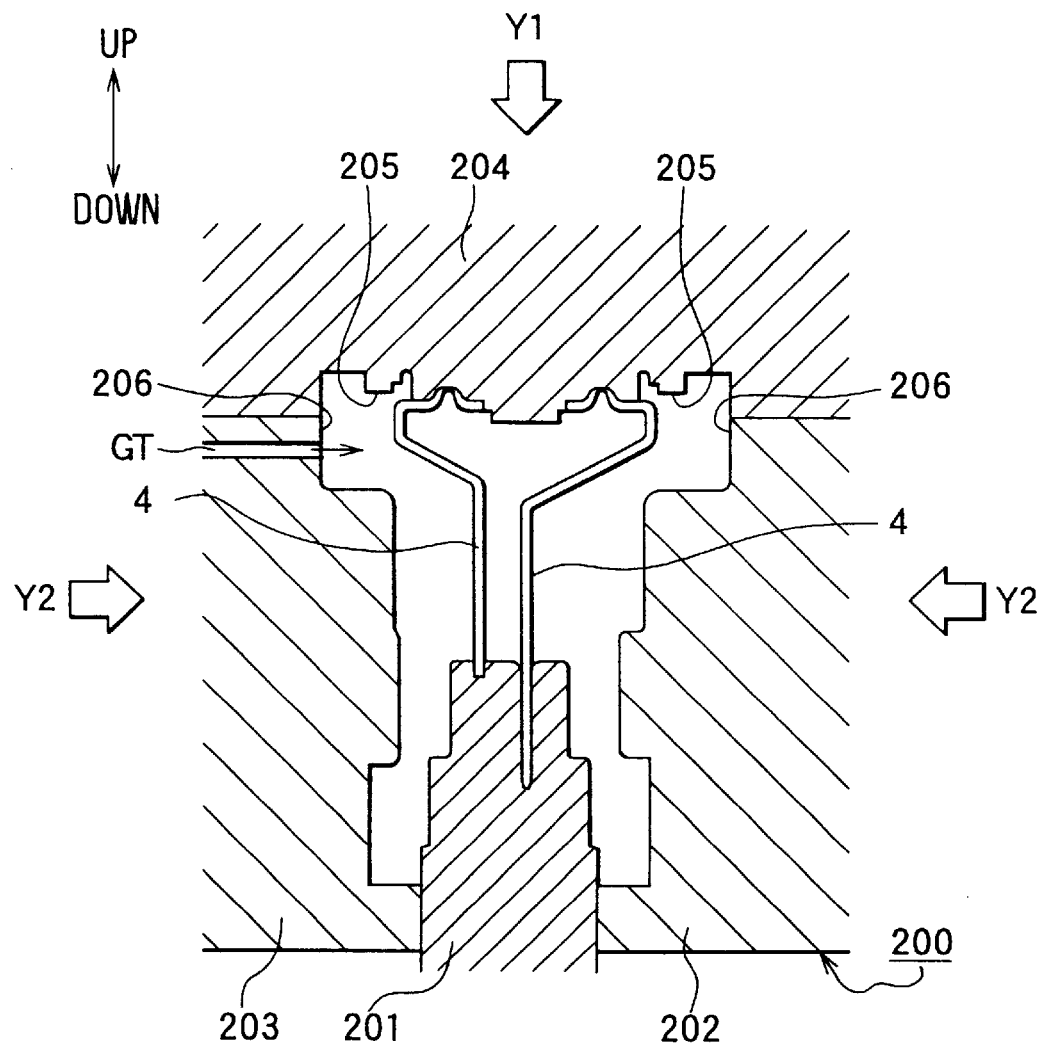
FIG. 7 is a cross-sectional view showing a molding die as a modification of that shown in FIG. 3.

In the molding device, the gates CT are provided at two locations; however, it is more preferable that only one gate GT is provided as shown in FIG. 7. When the gates are provided in the number of more than 1, resin injected from the gates hits each other in the molding die, and the surface roughness may be increased at the resin meeting portion (weld).

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method for manufacturing a pressure detecting apparatus, comprising;
    forming a first case by injecting resin into a molding die having a hollow portion corresponding to a contour of the first case; and
    assembling the first case with a second case to form a pressure detection chamber that holds a sensor element therein and that is hermetically sealed between the first case and the second case with an O-shaped ring sandwiched between first and second seal surfaces of the first case and the second case, wherein:
    the molding die has a seal correspondence surface for forming the first seal surface of the first case, and a gate provided at a position from which the resin is injected into the hollow portion to flow approximately in parallel with the seal correspondence surface, and
    an area of the hollow portion of the molding die corresponds to the seal correspondence surface, and the gate is arranged in proximity to the area so that the gate is approximately parallel with the seal correspondence surface to enable the resin to flow approximately in parallel with the seal correspondence surface.

2. The method according to claim 1, wherein:
    the first case is formed into a cylindrical shape, and is assembled with the second case at a first axial end side thereof;
    the first seal surface of the first case is provided at a second axial end side of the first case, and is parallel to an end surface of the first case at the second axial end side; and
    the gate is open on a surface that is exposed to the hollow portion and perpendicular to the seal correspondence surface.

3. The method according to claim 1, wherein the resin contains glass fibers.

4. The method according to claim 1, wherein the O-shaped ring is disposed at an outer periphery of the pressure conduction chamber.

5. The method according to claim 1, wherein the gate extends in the molding die approximately in parallel with the seal correspondence surface to an opening exposed to the hollow portion for injecting the resin.

6. The method of claim 1, wherein:
    the molding die further has a gate formation surface from which the gate opens into the molding die, and a shoulder formation surface between the seal correspondence surface and the gate formation surface relative to a surface periphery of the molding die,
    the seal correspondence surface is convex relative to the hollow portion of the molding die, and
    the shoulder formation surface is concave relative to the hollow portion of the molding die to channel the resin to flow approximately in parallel with the seal correspondence surface.

7. The method of claim 6, wherein the injecting of the resin comprises injecting the resin into the hollow portion to flow approximately in parallel along an entire surface area of the seal correspondence surface.

8. The method of claim 1, wherein the injecting of the resin comprises injecting the resin into the hollow portion to flow approximately in parallel along an entire surface area of the seal correspondence surface.

9. A method for manufacturing a pressure detecting apparatus, comprising:
    injecting resin into at least one gate of a molding die for forming a first case, wherein the molding die includes a hollow portion with molding die contours corresponding to contours of the first case and a seal correspondence surface for forming a first seal surface on the first case, and wherein the at least one gate is disposed next to one of the molding die contours so that the resin flows substantially in parallel with the seal correspondence surface; and
    assembling the first case with a second case for forming a pressure detection chamber that holds a sensor element therein and that is hermetically sealed between the first case and the second case with an O-shaped ring sandwiched between the first case and the second case, wherein the injecting of the resin comprises injecting the resin so as to flow approximately in parallel along an entire surface area of the seal correspondence surface.

* * * * *